United States Patent [19]
Alexander

[11] Patent Number: 5,741,342
[45] Date of Patent: Apr. 21, 1998

[54] APPARATUS AND METHOD FOR PREHEATING RAW MATERIALS FOR GLASS MAKING

[75] Inventor: Jeffery C. Alexander, Kent, United Kingdom

[73] Assignee: Edmeston AB, Vastra Frolunda, Sweden

[21] Appl. No.: 651,081

[22] Filed: May 22, 1996

[51] Int. Cl.$^6$ .................................................. C03B 3/02
[52] U.S. Cl. .................. 65/136.1; 65/27; 65/134.6; 165/104.14; 165/104.16
[58] Field of Search .................. 65/27, 134.6, 136.1; 165/104.14, 104.16

[56] References Cited

U.S. PATENT DOCUMENTS

| | | | |
|---|---|---|---|
| 4,225,332 | 9/1980 | Tsay | 65/134.6 |
| 4,306,899 | 12/1981 | Richards | 65/134.6 |
| 4,308,036 | 12/1981 | Zahedi et al. | 55/6 |
| 4,338,112 | 7/1982 | Propster | 65/27 |
| 4,338,113 | 7/1982 | Hohman et al. | 65/27 |
| 4,349,367 | 9/1982 | Krumwiede | 65/27 |
| 4,410,347 | 10/1983 | Krumwiede | 65/27 |
| 4,522,252 | 6/1985 | Klaren | 165/104.16 |
| 4,542,000 | 9/1985 | Alexander et al. | 423/244 |
| 4,588,429 | 5/1986 | Hohman et al. | 65/27 |
| 4,668,489 | 5/1987 | Alexander et al. | 423/240 |
| 5,060,719 | 10/1991 | Avidan et al. | 165/104.13 |
| 5,125,943 | 6/1992 | Cole | 65/27 |
| 5,342,427 | 8/1994 | Alexander | 65/27 |
| 5,399,181 | 3/1995 | Sorg | 65/27 |

Primary Examiner—Donald E. Czaja
Assistant Examiner—Sean Vincent
Attorney, Agent, or Firm—Burns, Doane, Swecker & Mathis, LLP

[57] ABSTRACT

A method is taught for separately preheating cullet and batch, material use in glass making. This method uses a two stage process for preheating batch in a way that allows water vapor to escape to the atmosphere before the main preheating stage. It supplements current preheating methods of the art of glass making. Apparatuses to carry out this method are also taught.

13 Claims, 3 Drawing Sheets

APPARATUS AND METHOD FOR PREHEATING RAW MATERIALS FOR GLASS MAKING

BACKGROUND OF THE INVENTION

Glass is made by heating and melting a mixture of materials to a liquid state. As the glass cools to ambient temperature and below, it becomes hard but does not leave the liquid state and crystallize. Glass is often referred to as a "super cooled liquid" rather than a solid. It is convenient to classify these materials of glass making into two categories, batch and cullet.

The term "Batch" generally refers to a mixture of inorganic materials such as silica sand, limestone, soda ash, salt cake, and a variety of other minor inorganic and organic ingredients well known in the art of glass making. Generally these materials are prepared in a finely divided form and are thoroughly mixed before introduction into the furnace to improve their melting rates and maintain a uniform quality to the glass. After mixing, separation of materials is possible, and can lead to inferior glass qualify. Often, the batch is wetted during or shortly after mixing. Water acts as a temporary binder to prevent individual grains of the batch material from separating.

The term "cullet" refers to recycled glass which is introduced into the furnace and melted into new glass. Cutlet is classified as either internal, i.e. , generated in the factory from production rejects, or external, i.e. , brought into the glass factory from outside sources such as recycled jars and bottles. Cullet from both sources is generally crushed to sizes which can be easily handled by material handling equipment, typically less than about 100 min. In the crushing some fine material less than 1 mm is generated, but typically this is a small proportion.

Preheating of batch and cullet using the heat of exhaust gases from the glass furnace has become accepted in the art of glass making as a viable means to reduce energy, and hence, lower cost. For example, U.S. Pat. Nos. 4,225,332; 4,306,899; 4,349,367; 4,668,489; 4,542,000; 5,290,334; and 5,342,427 (all incorporated herein by reference) teach preheating of glass making material with glass furnace exhaust (flue) gases. Normally, cullet and batch are mixed together before being fed into the glass melting furnace. However, because material flow problems, preheaters have only been successful at treating either pure cullet or cullet/batch mixtures with high percentages of cullet.

Essentially, two types of preheaters have been used, direct and indirect contact. Direct contact preheaters bring the hot furnace exhaust gases directly into contact with the material to be heated. In the case of preheating cullet only, direct contact has proven to be very effective at transferring heat from gas to the cullet and such technologies have found industrial use. However, these systems are limited to the few glass manufacturers who utilize large quantifies of cullet in their process. Generally, internal cullet comprises only about 15% of the total raw material needed for a glass furnace. Any additional cullet must come from external sources which depends heavily upon disciplined recycling programs. Therefore, the availability of cullet may vary significantly.

In the case of preheating cullet/batch mixtures, direct contact of gases invariably leads to large carryover of dust from the batch into the gases. This has been unacceptable to the industry because of limitations in allowable dust emissions from the furnace. Although filters to capture entrained dust can be implemented, the complexity of such systems have precluded their practical use in the industry. There are no technologies in use today which involve pure direct contact preheaters for batch.

Indirect preheaters generally take the form of channels containing batch/cullet mixtures alternated with channels containing hot gases. Heat is transferred through the metallic plates which divide the channels. Batch/cullet flows downward by gravity, while gas flow is typically horizontal. Such heat transfer systems have been a remedy to the problem of dust carryover, but are not without problems. Because of dust build-ups on the gas side of the metal plates, heat transfer rates are very low, requiring inordinately large devices. Further, solid material flow by gravity is unreliable, because some of the batch materials are water soluble and form clumps upon drying inside of the preheater. Indirect preheaters with high proportions of cullet mixed with batch are operational on an industrial scale, but they are quite large and expensive.

The present invention is a method and system for preheating both batch and cullet which remedies the concurrent problems of dust carryover into the preheating gas, poor heat transfer rates, solid material clumping and plugging inside of the preheater, and fouling of heat exchanger surfaces with dust on the gas side.

SUMMARY OF THE INVENTION

The first aspect of the present invention is a method for preheating glass manufacturing raw materials entering a glass melting furnace with exhaust gases from the furnace which comprises the following sequential steps:

a) Separating, or keeping separate, different glass manufacturing raw materials by size and other physical characteristics into a first stream material comprising larger sized particles having one set of physical characteristics and a second stream material comprising smaller sized particles having another set of physical characteristics including moisture content, b) Introducing the first stream material to the top of a first moving bed, c) Passing hot exhaust gases from the glass melting furnace through the first moving bed so that heat is transferred directly from the gases to the first stream material, d) Removing first stream material from the bottom of the first moving bed, e) Transferring heat from the first stream material previously heated by furnace exhaust gases to the second stream material to remove moisture from the second stream material, f) Introducing the first stream material to the top of a second moving bed after it has transferred heat to the second stream material, g) Providing one or more heat transferring conduits which are immersed in but pass through the second moving bed with no openings in the conduits at any point it is in contact with the second moving bed, h) Causing the dried second stream material to flow through the inside of the heat transferring conduits passing through the second moving bed, i) Passing hot glass making furnace exhaust gases through second moving bed so that heat is transferred from the gases to first stream material, and through the conduits, from the gases to second stream material and from first stream material to second stream material, j) Optionally imposing an electric field within second moving bed, (optionally the conduits acting collectively as the ground electrode) so that the second moving bed acts as an electrostatic filter to remove dust particles from said exhaust gases.

j) Feeding the heated first stream material and heated second stream material to the glass making furnace.

In a particularly useful embodiment, the first stream material is essentially all cullet and the second stream material is essentially all batch with the cullet particles being of a larger size than the batch particles. In another particularly useful embodiment the heat capacity flux of the first stream is less than the heat capacity flux of the second stream.

The second aspect of the present invention is an apparatus for carrying-out the first aspect.

DETAILED DESCRIPTION OF THE INVENTION

Figure 1:
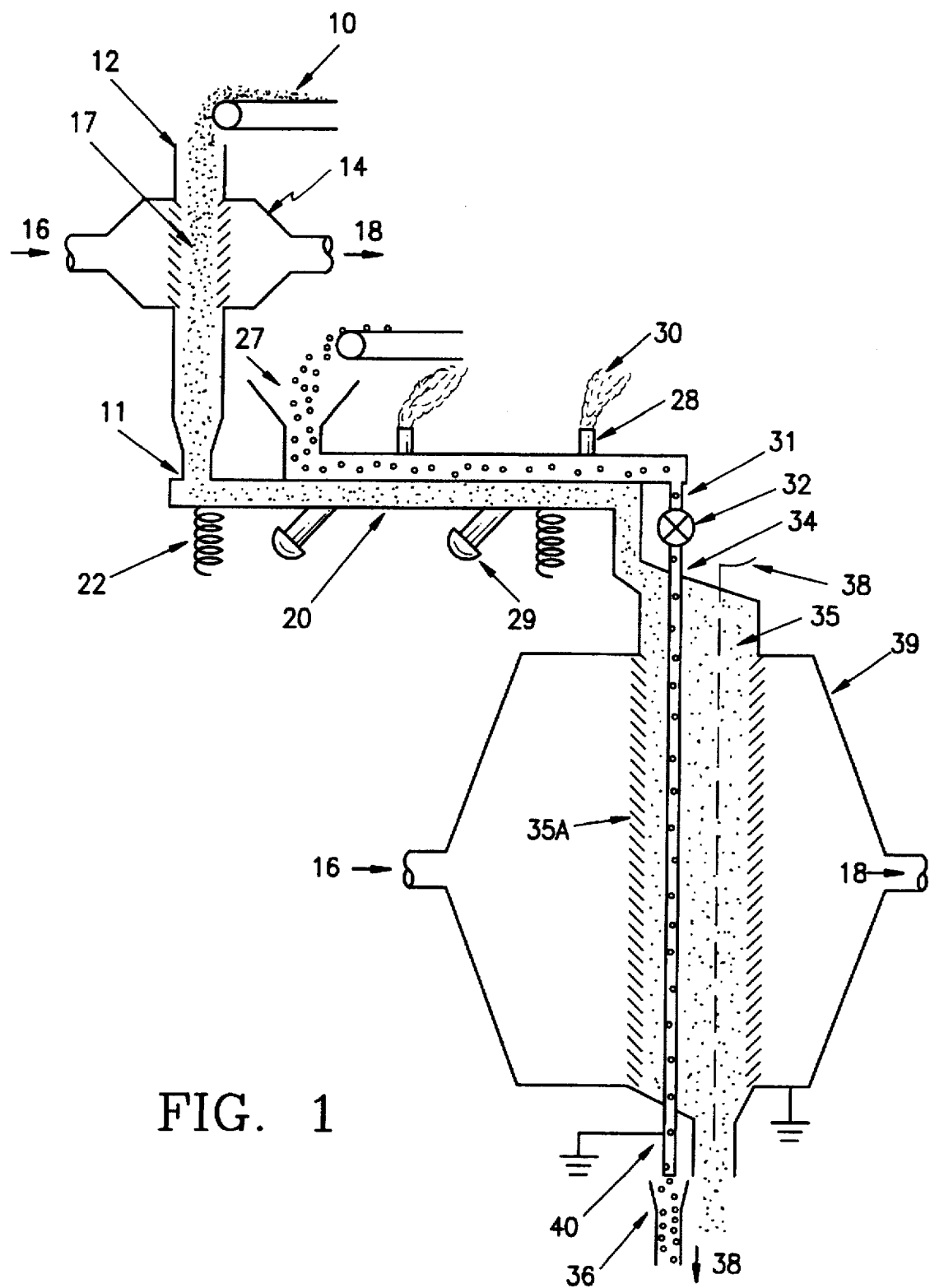
FIG. 1 is a schematic illustration of the entire invention and shows the flow of cullet and batch from entry into the preheating apparatus to entry into the furnace.

The main feature of the invention is that batch and cullet are preheated separately. It has been found that batch and cullet are significantly different materials in regard to their heat transfer, flow, and dusting properties. Thus, it is advantageous to preheated them separately with consideration for their respective potential problems and individual characteristics. The present invention capitalizes on the ease of preheating cullet to resolves the problems of preheating batch.

The present invention augments and advances the glass preheating technology of the art, in particular the art taught in U.S. Pat. No. 5,342,427 ('427) and U.S. Pat. No. 5,556,443 ('433) (incorporated herein by reference).

It has been discovered that the heat transfer rates for gas to cullet by direct contact are extremely high. Further, if the cullet preheater system is constructed to be compatible with, and work in concert with, the technology taught in '427, carryover of fine dust from the cullet preheater unit will essentially be curtailed. In fact, the cullet preheater can be made to function as a high efficiency filtering system for dust incoming with the inlet gas stream. This feature is the result of careful design and of the fact that only cullet (with only minor quantities of free material) are heated in the direct contact device. Such a direct preheater designed for efficient preheating of cullet would not be practical for preheating normal batch.

A two stage cullet heating concept is taught in '427. First the cullet is heated in an upper stage to dry the cullet and drive off organic materials. Then the cullet is passed through a second stage where flue gas filtering and further heating of the cullet takes place. It has been discovered that the cullet can be heated in the upper stage of the invention of '427 to a high temperature with a relatively small heat exchanging device. This is the result of the exceptional heat transfer rates afforded by the direct contact heat exchange. The present invention takes advantage of this discovery.

By comparison, preheating of batch (which has a higher heat capacity flux than cullet) is more difficult than preheating cullet. As previously stated, batch must be heated indirectly by heat exchangers to avoid the unacceptable dust emissions. In addition, indirect heating avoids lost of batch material and segregation of batch components. Further, batch contains moisture varying from about 1% to about 3% by weight and contains water soluble components, such as soda ash and sodium sulphate. Upon drying, the batch components tends to stick together forming clumps and stick to the metal surfaces of the heat exchanger leading to blockage of flow. Therefore, it is advantageous to first heat the batch enough to drive off the moisture and provide a vented environment during this heating to facilitate the escape of the resulting water vapor. Any clumps can be broken-up by mechanical agitation prior to entry into the primary heat exchanger.

Indirect heating of batch presents another problem. The surfaces of the heat exchanger are prone to dust build-ups resulting in poor heat transfer rates. The dust contained in the exhaust gases is water soluble and the gas stream exhibits an elevated acid dew point temperature due to presence of $SO_3$. Cold heat exchanger surfaces experience acid condensation and build-ups of dust on the wetted surfaces. The dust in the furnace exhaust gases are complex eutectic salt mixtures, which exhibit relatively low melting points. In some regions of the heat exchanger, surfaces are hot enough to exceed the melting point of these eutectics, again leading to build-ups of deposits. In short, the heat exchanger surfaces foul because of both the low temperature/high temperature phenomenon particularly prevalent in prepheating batch.

The present invention capitalizes on the ease of preheating cullet or an inert, durable material to resolves the problems of preheating batch. This can be accomplished by either keeping cullet and batch separate in the preparation processes, or by simple screening techniques to separate the mixture. An important consideration is to produce two separate material streams, the first stream consisting of larger sized particles (typically $\phi > 2$ mm), which may be cullet or a durable material, and a second stream of smaller sized particles (typically $\phi < 2$ mm), usually batch.

In the present invention, the first stream of larger size material is usually exclusively cullet and the second stream is usually exclusively batch. In some cases, finely sized cullet could be included in the second stream (such as resulting from fine grinding of cullet). Therefore, to simplify the detailed description of the present invention, hereinbelow the term "cullet" will be used for "first stream material" and the term "batch" will be used for "second stream material". The water soluble constituents are usually exclusively present in batch, hence, in the second stream.

In FIG. 1, the first stream material 10 is introduced into the upper end 12 of a direct contact heat exchanger, termed a "pyrolyzer" 14 where hot exhaust (flue) gases from the furnace 16 are passed through the moving cullet bed 17. The cooled gases from the pyrolyzer 18 are returned to the furnace or vented to the atmosphere. The pyrolyzer is essentially inner column surrounded by an outer chamber through which the hot furnace gases pass. The inner column has multiple slits, louvers, or similar openings to allow the furnace gases pass through the column and contact the cullet directly. See U.S. Pat. No. 5,556,433. It is preferable for the column passing through the pyrolyzer to be substantially angled to facilitate the flow of the cullet through the pyrolyzer by gravity. However, the stream of cullet can be propelled through the pyrolyzer by a force other than gravity.

Figure 2:
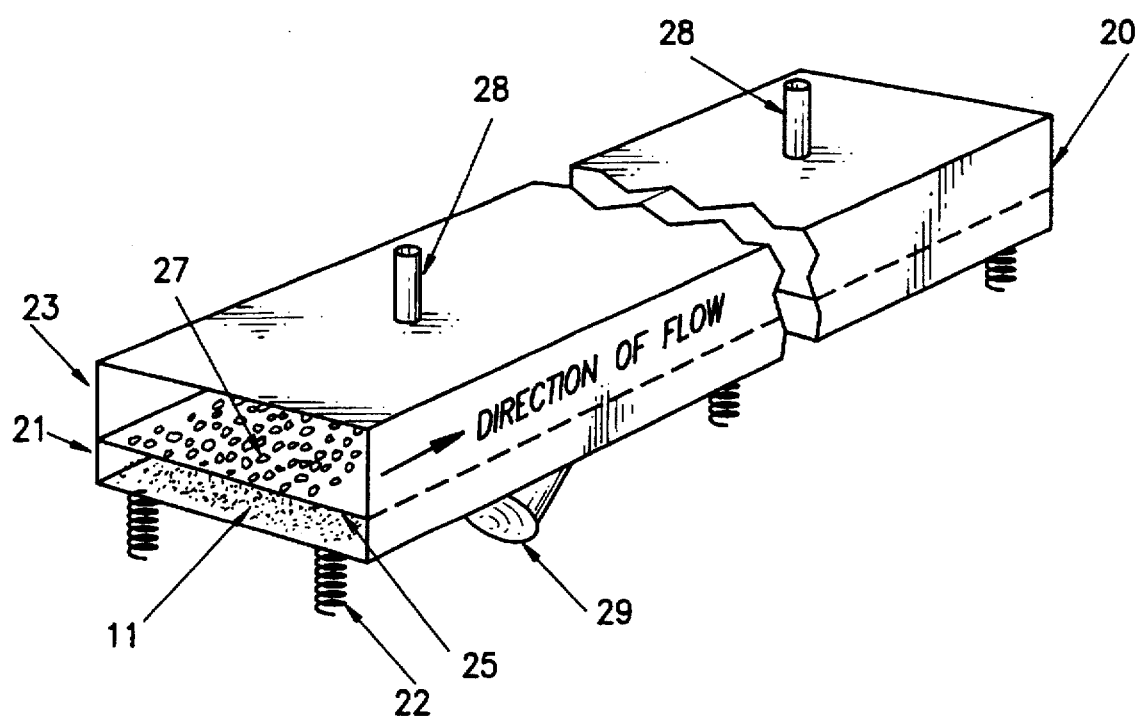
FIG. 2 is a cross sectional view of the vibrating conveyor, solid-solid heat exchanger shown as component 20 in FIG. 1.

As the hot cullet 11 leaves the pyrolyzer, it enters into the solid-solid heat exchanger 20. The solid-solid heat exchanger may advantageously be located below the exit of the pyrolyzer, i.e., the bottom if the pyrolyzer is oriented as is shown in FIG. 1, because the cullet can leave the pyrolyzer and enter the heat exchanger under the force of gravity. The solid-solid heat exchanger may conveniently be a conventional vibrating material conveyor with two separate trays forming a lower compartment 21 and an upper compartment 23 as shown in FIG. 2. This conveyor system is spring mounted 22 and activated by one or more vibrators 29. Single tray conveyors of similar design are widely used in the glass making industry for independently conveying materials. The trays are in close proximity so that the ceiling of the lower compartment 25 is the floor of the upper compartment.

Cold, moist batch 27, is introduced into the upper compartment of the solid-solid heat exchanger so that the two material streams are not intermingled, and so that the depth of the batch layer in the upper compartment is relatively thin. It is preferential that the hot cullet completely fills the lower compartment and actually contacts the underside of the tray carrying the batch, i.e., the floor of the upper compartment. Note that after the hot cullet 11, in FIGS. 1 and 2, enters the lower compartment it travels through that compartment transferring heat to the batch in the upper compartment by conduction, convention, and radiation. Moisture is driven off the moist batch and accumulates as water vapor in the space above the batch. The upper compartment is provided with vents 28 to allow the water vapor 30 to escape.

The solid-solid heat exchanger is long enough so that the batch is completely dried while it is in the upper compartment. Agglomeration of batch may occur on the upper compartment during the drying. Therefore, the discharged dry batch 31 passes through a clump breaker 32 of conventional design. The dry batch leaving the clump breaker would less than about 2 min. Controlled agglomeration is a benefit in the glass manufacturing because it minimizes segregation of components upon subsequent material handling. In some case it may be desirable to promote agglomeration by adding (or substituting for one of the batch ingredients) a binder material such as caustic soda (NaOH) or burnt lime (CaO).

The possibility also exists that the solid-solid heat exchanger upper compartment would become clogged with build-ups of dried batch. In this event, the compartment would be easily accessible for manual or automated cleaning.

Cullet leaving the lower compartment of the solid-solid heat exchanger would be cooler than that entering, but would still be at a temperature sufficiently hot for use of a electrostatic filter. This "warm" cullet is discharged directly into a hopper distribution system and flows by gravity or mechanical action into the filter module 39 similar to that taught in '427 as a second moving bed 35. Its subsequent treatment within the module is consistent with the teaching of '427.

Dry batch discharged from the solid-solid heat exchanger through the clump breaker is directed to flow through a conduit or, preferably, multiple conduits 34 which extend downward through the second moving cullet bed 35. The conduit(s) may be tube(s), preferably of round cross section and diameter in the range of about 50 to about 100 mm, although other cross sectional shapes and sizes could also be used. The internal walls of the tubes are smooth and continuous to promote good flow of dry batch. The tubes are constructed of a material capable of withstanding high temperatures, e.g., in excess of 800° C., having a high resistance to corrosion, having good heat transfer properties, and, when used in an electrostatic dust control system, having good electrical conductive properties e.g., steel alloy. During the residence time of batch within the tubes, heat would be transferred into the batch from the surrounding hot gases and hot cullet in the bed.

Hot batch exits the lower end of the tubes to a common hopper 36. From the hopper, heated batch is directed to flow into the furnace 38 for melting. Feed rate of the batch is controlled at the furnace feed point, and the delivery of dry batch to the top of the tubes is controlled to maintain the tubes fall of batch at all times. Preferably the flow of batch through the tubes is caused by gravity, but other forces, such mechanical impellers, could be used.

Cullet also flows downward through the bed surrounding the tubes. Heat transfer to the tubes within the cullet bed is more efficient than simply tubes within the hot gas flow, for the following reasons:

Cullet flow keeps the gas-side of the tubes clean, defeating the natural tendencies for dust build-ups to impede the heat transfer.

Heat is transferred to the tubes not only from the hot gases, but also from the hot cullet in contact with the tubes. Thus, additional heat is transferred form the gas to the cullet and then from the cullet to the tubes.

The presence of the cullet in close proximity to the tubes' surface acts to reduce the size of the gas and thermal boundary layers, thus improving the heat transfer from the gas to the tube directly.

The tubes are preferentially located at the furnace flue gas inlet side of the bed 35a, in order to improve the heat transfer to the tubes and also to allow the implementation of a high voltage electrode 38 within the bed for dust capture from the furnace exhaust gases. The use of high voltage electrostatic fields, e.g., in the order of magnitude of $10^3$ volts, to capture dust is well recognized in the art of glass making, e.g., see U.S. Pat. Nos. 4,338,113 and 4,308,036. The tubes collectively act as the ground electrode 40 for the imposition of the electric field. When arranged in this way, the spacing between the tubes would necessarily be less than the spacing of the tubes to the electrode, in order to provide optimum electric field shape within the bed. Also, by virtue of this design, the electrostatic cullet bed would be at a lower temperature than otherwise. Since the electrical conductivity of cullet is an increasing function of temperature, a stronger electric field could be maintained in the cullet bed. This would improve the electrostatic capture of dust from the flue gases.

Cullet leaving the bed will be hot from direct contact with the flue gases and will have captured dust particles with it. These will be directed to flow to the furnace for melting. Conventional equipment for handling there materials can be employed.

Figure 3:
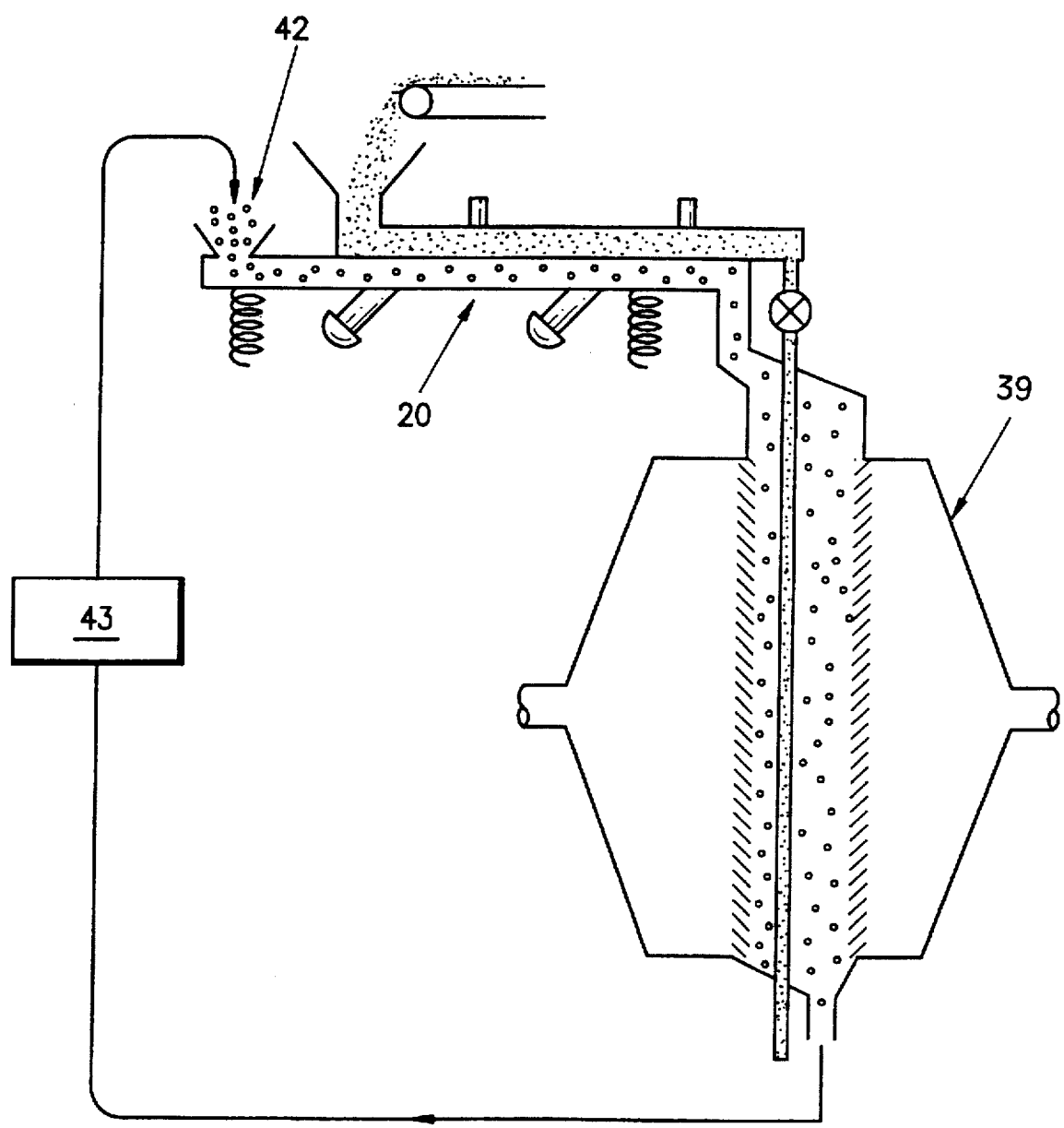
FIG. 3 is a simplified schematic illustration of the alternative mode of the operation of the invention when cullet is not available.

In some cases where little or no cullet is used in the glass melting raw materials or where it is desirable to grind cullet into small particle sizes prior to melting, it is desirable to employ the alterative embodiment of the present invention. In this embodiment, a durable granular material, such as limestone, is used in place of the cullet as depicted in FIG. 3. However, after leaving the bottom of the filter bed, this material is transported to the top of the system 42 by conventional means in the art of glass making, cleaned of captured dust by means practiced in the art 43, and returned to the system in place of the cullet infeed (shown as 11 in FIG. 1). Batch (possibly with finely ground cullet) is also be introduced to the solid-solid heat exchanger 20, as in the first embodiment, and dried. In the alternative embodiment, the tubes containing batch would then extend downward through the bed of the durable granular material rather than a bed of cullet. In this case, if the material transport is done in such a way as to minimize heat loss of the granular material, the pyrolyzer would no longer be required. The granular material exiting the bottom of the bed would be hot, and could be returned hot directly to the solid-solid heat exchanger. In essence, the durable granular material is functioning as a heat exchange and dust removal medium but unlike in the case of cullet, the durable granules are recycled through the system.

I claim:

1. A method for pre-heating glass manufacturing raw materials entering a glass melting furnace with hot exhaust gases from said furnace which comprises the following sequential steps:
   a) separating different glass manufacturing raw materials by size and other physical characteristics into a first stream material comprising larger sized particles having one set of physical characteristics and a second stream material comprising smaller sized particles having another set of physical characteristics including moisture content,
   b) introducing said first stream material to the top of a first moving bed,
   c) passing hot exhaust gases from said glass melting furnace through said first moving bed so that heat is transferred directly from said gases to said first stream material,
   d) removing first stream material from the top of a first moving bed,
   e) transferring heat from said first stream material previously heated by furnace exhaust gases to the second stream material to remove moisture from said second stream material,
   f) introducing said first stream material to the top of a second moving bed after it has transferred heat to the second stream material,
   g) providing one or more heat transferring conduits which are immersed in, but pass through, said second moving bed with no openings in the conduits at any point the conduits are in contact with the second moving bed,
   h) causing the dried second stream material to flow through the inside of said heat transferring conduits passing through said second moving bed,
   i) gassing hot glass making furnace exhaust gases through second moving bed so that heat is transferred from the gases to said first stream material and through said conduits from the gases to said second stream material and from first stream material to second stream material, and
   j) feeding the heated first stream material and heated second stream material to said glass making furnace.

2. The method of claim 1 wherein raw material particles are all or substantially all of size less than about 2 mm diameter.

3. The method of claim 1 wherein said conduits are vertically inclined tubes.

4. The method of claim 1 wherein a further step of imposing an electric field within second moving bed, so that the second moving bed acts as electrostatic filter to remove dust particles from said exhaust gases is included between steps i and j.

5. The method of claim 4 wherein said tubes are located at the gas inlet side of the bed.

6. The method of claim 1 wherein the heat capacity flux of said first stream material is less than the heat capacity flux of said second stream material.

7. The method of claim 1 wherein the heat removed from the bottom of said moving bed via the first stream material is less than the heat removed from the bottom of the conduit via the second stream material.

8. The method of claim 3 wherein said tubes are of circular cross section.

9. The method of claim 8 wherein said tubes are between about 40 mm and about 200 mm in diameter.

10. The method of claim 1 wherein heat transfer for drying of second material stream is by indirect means and the two streams are not intermingled.

11. The method of claim 1 wherein a binder material is added to second stream material, so that agglomerates of second stream material are formed.

12. A method for heating glass manufacturing raw materials utilizing exhaust gases from a glass melting furnace which comprises the following sequential the steps:
   a) providing a moving bed of durable granular material, and introducing the durable granular material to the top of the moving bed,
   b) passing furnace exhaust gases through the moving bed so that heat is transferred from the gases to the durable granular material,
   c) providing means to transport hot, durable granular material from the bottom of moving bed to a solid-solid, moving bed heat exchanger,
   d) transferring heat from the hot, durable granular material to raw material within the solid-solid, moving bed heat exchanger in order to remove moisture from raw material,
   e) reintroducing durable granular material to top of moving bed of step a after passing through the solid-solid moving bed heat exchanger,
   f) providing tubes which are immersed in the moving bed,
   g) providing means to cause the dried raw material to flow through the tubes,
   h) providing means to transfer heat from flue gases to raw material, from flue gases to durable granular material and from durable granular material to raw material, and
   i) providing means to feed the heated raw material into the furnace.

13. An apparatus for pre-heating glass manufacturing raw materials entering a glass melting furnace with hot exhaust gases from said furnace which provides the means for carrying out the following sequential steps:
   a) separating different glass manufacturing raw materials by size and other physical characteristics into a first stream material comprising larger sized particles having one set of physical characteristics and a second stream material comprising smaller sized particles having another set of physical characteristics including moisture content,
   b) introducing said first stream material to the top of a first moving bed,
   c) passing hot exhaust gases from said glass melting furnace through said first moving bed so that heat is transferred directly from said gases to said first stream material, d) removing first stream material from the top of a first moving bed, e) transferring heat from said first stream material previously heated by furnace exhaust gases to the second stream material to remove moisture from said second stream material, f) introducing said first stream material to the top of a second moving bed after it has transferred heat to the second stream material, g) providing one or more heat transferring conduits which are immersed in but pass through said second moving bed with no openings in the conduits at any point the conduits are in contact with the second moving bed, h) causing the dried second stream material to flow through the inside of said heat transferring conduits passing through said second moving bed, i) passing hot glass making furnace exhaust gases through second moving bed so that heat is transferred from the gases to said first stream material and through said conduits from the gases to said second stream material and from first stream material to second stream material, and i) feeding the heated first stream material and heated second stream material to said glass making furnace.

* * * * *